Feb. 25, 1930.   J. L. EVANS   1,748,334
CHAIN CONVEYER LINK
Filed May 1, 1926   2 Sheets-Sheet 1
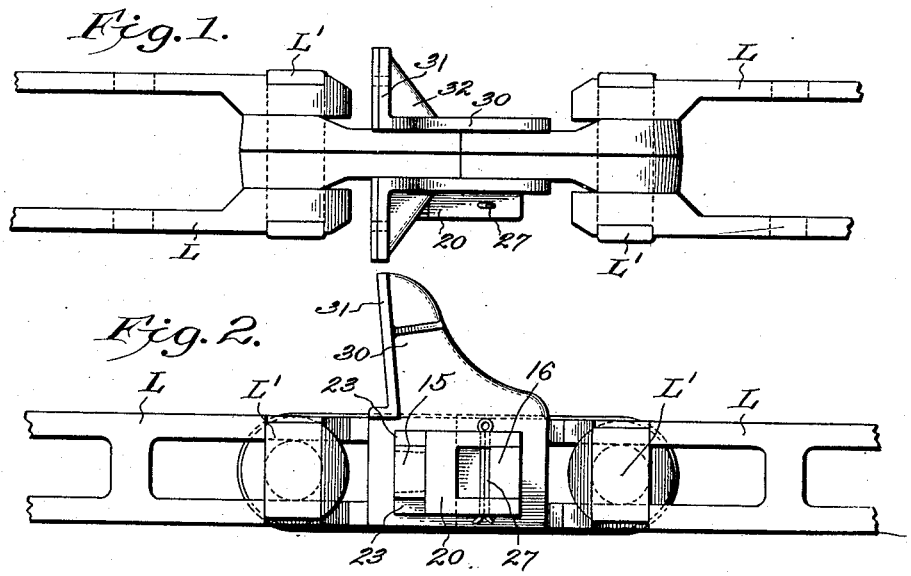
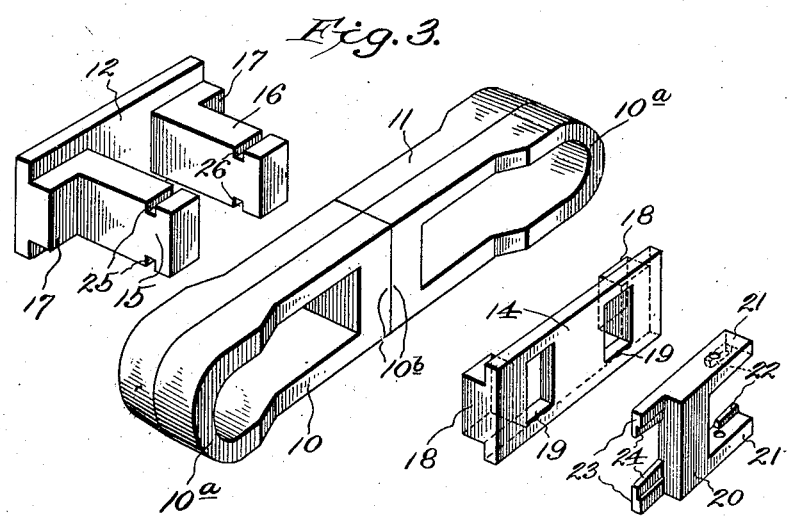
Inventor
John L. Evans
By Hubert E. Vick   Attorney

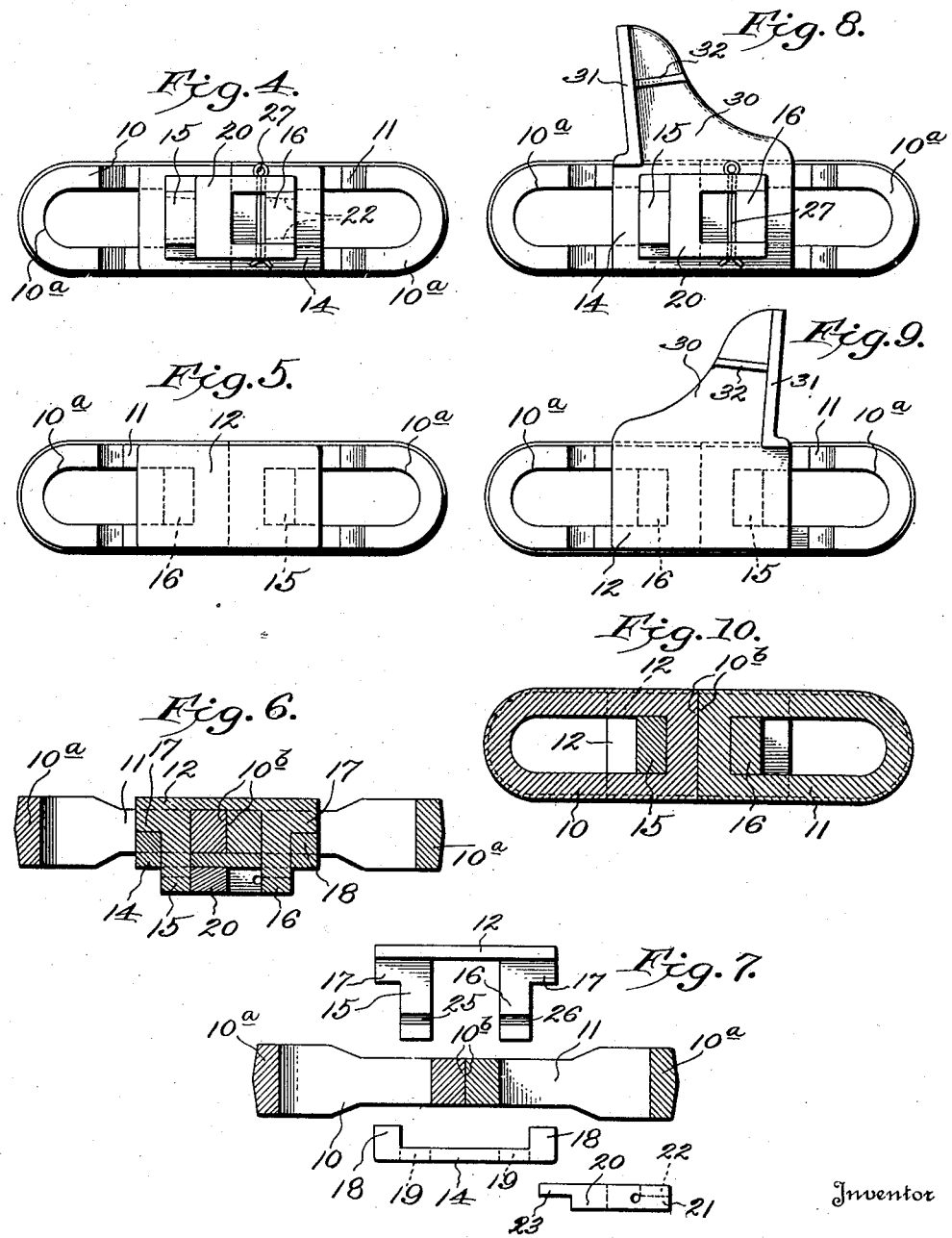

Patented Feb. 25, 1930

1,748,334

UNITED STATES PATENT OFFICE

JOHN L. EVANS, OF SCRANTON, PENNSYLVANIA

CHAIN-CONVEYER LINK

Application filed May 1, 1926. Serial No. 105,986.

This invention relates to certain improvements in chain conveyer links, and the nature and objects of the invention will be readily recognized and understood by those skilled in the art involved in the light of the following explanation and detailed description of the accompanying drawings illustrating what I at present consider and believe to be the preferred embodiments or mechanical expressions of the invention from among various other forms, arrangements, combinations and constructions of which the invention is capable within the spirit and scope thereof.

The invention is particularly directed, although not limited, to conveyers of the endless chain types such as employed for moving or conveying coal and such like materials at the mine, from one point to another, usually over a considerable distance. Such types of conveyers are characterized generally by an endless chain sliding through and along a trough or channel, and the chain is provided at intervals therealong with flights or "push plates" movable therewith for engaging and forcing the coal through the trough or channel to the desired point of discharge or delivery. The conveyer chains are usually driven from and by suitable power driven sprocket wheels or drive mechanism, and are subjected to considerable stress and strains through the weight of coal conveyed thereby and the necessary large amount of power applied thereto in order to drive the same.

With conveyer chains of the foregoing types, considerable difficulty is encountered in practice from breaking of the links of which the chain is formed, due to the strains and stresses to which they are subjected in use, arising from the load of material and the applied operating power imposed thereon, as well as the wear encountered in service. When the conveyer chain parts by breakage or failure in a link thereof, a large amount of time and labor is required to repair the same, with the result that the conveyer is rendered inoperative for a considerable period and large losses are entailed. The main factors contributing to the repair of a broken chain and causing the expenditure of so much time and labor, are, the necessity for securing sufficient slack in the chain, which usually requires moving the sprocket drive mechanism, to allow of bringing the ends of the chain together with the broken link removed for insertion of a new link, and the return of the sprocket mechanism to normal operative position, as well as retrieving the ends of the broken chain and bringing them together for insertion of the new link.

One of the main and fundamental objects of the present invention is to overcome the foregoing problems and difficulties by the provision of a conveyer chain link which can be readily applied to and connected into a chain to replace a broken link, without the necessity of obtaining slack in the chain, so as to eliminate the time and labor involved with resulting losses entailed by the slack securing operation.

Another object of the invention is to provide a conveyer chain link which is formed of sections and locking means therefor, all so designed and constructed that the link sections can be applied to a chain laterally thereof to connect adjacent links of the chain without requiring slack in the chain.

A further object of the invention is to provide a conveyer chain link formed of separable sections locked together, which link can be readily inserted in or removed from a chain by separating the sections in a minimum of time with a minimum of effort.

A further object of the invention is to provide a conveyer chain link formed in sections secured together by laterally removable side plates designed to form a central solid block portion binding and holding the link sections rigidly together in link forming position against twisting or turning, and which link so formed presents an exceedingly strong structure against breakage or failure under the large strains and stresses to which subjected in use.

Another object of the invention is to provide a design and construction of separable section link capable of being quickly connected in and removed from a chain, and such a link which is adapted for use with chains generally.

With the foregoing general objects, and certain other objects and results in view, which other objects and results will be readily recognized by those familiar with the art from the following explanation, the invention consists in certain novel features in construction and in combinations and arrangements of elements, as will be more fully and particularly referred to and specified hereinafter.

Referring to the accompanying drawings, in which similar reference characters refer to corresponding parts throughout the several figures thereof:

Fig. 1, is a view in top plan of a portion of a conveyer chain with a link of the invention connected therein, the link formed to provide a flight or "push plate."

Fig. 2, is a view in side elevation of Fig. 1.

Fig. 3, is a detail perspective view of a link of the invention with the parts thereof disassociated and in their relative positions for assembly.

Fig. 4, is a view in side elevation of the link of Fig. 3 in assembled link forming position, taken from the locking side thereof.

Fig. 5, is a view in side elevation of the link of Fig. 4 taken from the opposite side.

Fig. 6, is a longitudinal horizontal section through the link of Fig. 4.

Fig. 7, is a top plan view of the link of Fig. 4 in position with the parts disassociated, the link sections being shown in horizontal section.

Figs. 8 and 9, are views in side elevation taken from opposite sides of the assembled link of Fig. 1, formed with the flight or "push plate."

Fig. 10, is a vertical longitudinal section through the link of Fig. 4.

The invention is presented in the accompanying drawings as embodied in a link adapted for conveyer chains of the coal or like material conveying types, but it is to be understood that such embodiments are purely by way of example and not of limitation, and were selected because the problems solved and disadvantages overcome by the invention are present in a high degree in such types of conveyer chains, and hence serve to more clearly bring forth and exemplify the invention. The principles and features of the invention are capable of embodiment generally to provide links adapted to various other types of chains for other purposes, as will be obvious to those skilled in the art.

In the illustrated embodiments, according to the principles of the invention, a conveyer chain link is formed of the separate centrally open and closed end link sections 10 and 11 having the usual rounded and thickened outer ends 10ª, to receive and form bearings for the pins of adjacent links extending transversely therethrough. The inner closed ends 10ᵇ of the link sections are formed squared to present flat end faces for abutting with the sections in longitudinally alined, link forming position. Opposite side plates 12 and 14 are provided for clamping and locking tightly against opposite sides of the link sections 10 and 11 over and against the sides of the inner abutting ends 10ᵇ thereof, to secure the sections rigidly together in link forming position and arrangement. These side plates 12 and 14, in the example hereof, are of a width equal to the depth or width of the link sections and in assembled position having their outer or upper and lower edges substantially flush with the outer, or upper and lower longitudinal edge faces, respectively, of the link sections in assembled position.

The side plate 12 is formed with the spaced, laterally projecting bars 15 and 16, rectangular in cross section in the present example, of a thickness or depth equal to the internal width or depth of the centrally open portions of the link sections 10 and 11, and spaced apart a distance equal to the thickness of the combined closed ends 10ᵇ of the link sections when the latter are in assembled, abutting and link forming position. The bars 15 and 16 are spaced inwardly from the ends of plate 12, but have their base portions laterally extended outwardly to the adjacent edges of plate 12, to form the projecting blocks 17 on the inner side or face of the plate which are of a thickness substantially equal to one-half the transverse width or thickness of the inner ends of link sections 10 and 11. The plate 12 is positioned and applied against one side of the abutting link sections 10 and 11 with the bars 15 and 16 extending transversely through the inner ends of the sections, respectively, at opposite inner sides of the abutting closed link section ends, with such abutting section ends 10ᵇ received therebetween and held thereby into rigid, tightly abutting position against movement. In this position the blocks 17 extend a distance into the centrally open spaces of the link sections, and the bars 15—16 extend a distance outwardly and beyond the opposite sides thereof.

The opposite side plate 14, is formed of a size substantially conforming to that of plate 12, as will be clear by reference to the drawings, and is provided with the opposite end blocks 18 projecting from the inner surface or face thereof in position corresponding to blocks 17 of plate 12 for alinement with and abutting against the same in assembled position of the plates as will be explained. Adjacent the inner sides or edges of plate blocks 18, the plate 14 is formed with the squared openings 19 transversely therethrough, disposed in such position thereon as to receive and form a tight running fit with the bars 15 and 16 of plate 12. The plate 14 is applied to and against the side of link sections 10 and 11, opposite the plate 12, with the bars 15 and 16 extending through and outwardly a distance therebeyond (see Figs. 1, 3 and 5 in particular), and the blocks 18 thereof extending into the inner ends of the central openings of the link sections, to and abutting against the blocks 17 of plate 12 (see Fig. 5). Thus, in assembled position of the link sections and opposite side clamping and locking plates 12 and 14, the link sections 10 and 11 are rigidly secured and held together in alined, abutting and link forming position, with the central portion of the link so formed presenting and formed with a substantially solid, closed central portion through the medium of the abutting section ends $10^b$, bars 15 and 16, and abutting plate blocks 17 and 18. The construction and arrangement is therefore such, that the link sections 10—11 are held rigid and immovable against lateral, or longitudinal play or movement, by the bars 15—16 clamping and binding the section ends $10^b$ in abutting relation, and by the abutting plate blocks 17 and 18.

Locking means is provided by the invention for securing the side plates 12 and 14 in the assembled link section clamping and binding position, as above described, and in the specific example hereof, embodies a key plate 20, formed U-shaped plan view, and having the spaced legs 21 for receiving the outer end of bar 16 therebetween with the base of plate 20 fitting against the inner side of the arm. Flanges 22 are formed extending inwardly from the outer end portions of legs 21 adjacent and in continuation of the inner side or surface of plate 20, and extending longitudinally of the legs to and terminating a distance from the inner ends thereof to permit bar 16 of plate 12 to pass through the plate 20 between the base end thereof and the inner ends of leg flanges 22. Projecting arms 23 are formed extending from the outer end of the base of plate 20, in continuation of the inner side or surface thereof and are provided with the reduced inner edges or flanges 24. The outer projecting end of the bars 15 and 16 of side plate 12 are formed with the upper and lower grooves 25 and 26, respectively, extending thereacross and arranged to slidably receive flanges 24 and 22 of the key plate 20.

The key plate 20 is applied to the link by placing the same over the projecting end of bar 16 with the bar against the inner edge of the base of the plate and flanges 22 and 24 of the plate alined with the bar grooves 26 and 25, respectively, and is then forced toward the projecting end of bar 15 into position with flanges 22 and 24 seated in their respective bar grooves, and the bar ends disposed between the arms 23 and legs 21 of the key plate, thus locking the side plates 12 and 14 in position. A cotter pin or the like 27 is then passed through and across legs 21 at the inner side of bar 16 to prevent the key plate from working or sliding from locking position. If desired the arms 23 and the inner flanges 24 thereof can be formed slightly tapered or inclined to secure a wedging action in the bar grooves 25.

With the link of the invention hereof designed for use in and with conveyer chains, the side plates 12 and 14 can be formed to provide the flights or "push plates" of a conveyer for engaging the material, in which form the side plates 12 and 14 each have the upwardly projecting wall portion 30 in continuation thereof with the laterally extending flight or "push-plate" portion 31 disposed transversely thereof and outwardly from wall 30 and the link side plate. Suitable strengthening webs 32 can be provided between the plate portions 31 and the walls 30, as will be clear by reference to the drawings. The flights or "push plates" so formed, are preferably as in the example hereof, formed integrally with the link side plates 12 and 14, and in assembled link forming position the strains and stresses imposed on the flight are transmitted to and absorbed by the central solid portion of the link, hereinbefore described, so that a strong rigid structure results.

In Figs. 1 and 2 of the accompanying drawing a link of the invention is shown in assembled position connected to the adjacent links L of a conveyer chain with the link pins L' extending through and coupling the link ends $10^a$ thereto, all in the usual manner well understood in the art. Now, assuming that one of the links L of the conveyer chain has broken in use, and that the link of the invention has been inserted and connected in the chain to replace such broken link, as shown by Figs. 1 and 2. Upon breaking of a link L and parting of the chain, the operation of the chain is stopped and the broken link removed. The broken ends of the chain are then recovered and brought into line in the usual manner and spaced apart a distance equal to the removed link. Heretofore with the conventional links in use it was necessary to secure slack in the chain to bring the ends thereof together in order to insert a new link of the usual type, which generally required moving the sprocket drive mechanism, as previously explained and well understood by those familiar with conveyer chains.

With the invention, however, a link thereof is disassembled, as shown in Figs. 3 and 7, and the link sections 10 and 11 are connected to the opposite chain end links L by the pins L', after which the sections are placed in abutting link forming position, the chain ends being drawn together by draw bars or other suitable means of the type usually employed. The side plate 12 with bars 15—16 is applied, plate 14 is then applied to the opposite side of the link sections, over and receiving bars 15—16, and the key plate 20 is mounted over and forced into locking position on the ends of the bars 15—16, the cotter pin being inserted through the legs of key plate 20 to prevent displacement from locking position. Thus, the conveyer chain is repaired without securing slack therein and with the expenditure of a minimum of time and labor. The construction of the link, as described, is such that in assembled position thereof it presents a link of great strength.

When it is desired to remove a link of the invention from a chain, the key plate is withdrawn, to release side plates 12 and 14 and permit of their removal, after which the link sections 10—11 can be removed from connection with adjacent links through removal of the connecting pins, as L′. It will be noted that in both applying the link and removing the same, no movement of link sections 10—11 longitudinally of the chain is called for after they are in abutting position, and all movements of applying and removing the side plates are performed laterally of the sections without moving the same.

It is also evident that various changes, modifications, variations, and substitutions might be resorted to without departing from the spirit and scope of my invention and hence I do not wish to limit myself to the exact and specific disclosures hereof.

Desiring to protect my invention in the broadest manner legally possible, what I claim is:

1. In a link, longitudinally alined and abutting link sections, and members disposed at opposite outer sides of and interlocking with said link sections to maintain the same in abutting and rigid link forming position.

2. In a link, longitudinally alined and abutting link sections, opposite side members engaging said sections to maintain the same in abutting and rigid link forming position, and means for locking said side members in position.

3. In a link, separate closed end link sections longitudinally alined with the closed inner ends abutting, a side plate having projecting bars extendings through the link sections at opposite sides of the abutting closed ends, and an opposite side plate fitting over the ends of said bars with the link sections held in rigid, link forming position.

4. In a link, separate closed end link sections longitudinally alined with the closed inner ends abutting, a side plate having projecting bars extending through the link sections at opposite sides of and clamping the abutting closed ends of the sections, an opposite side plate fitting over the ends of said bars and against the link sections with the bars extended beyond the said plate, and locking means engaging the outer ends of said bars to secure the plates and link sections in link forming, rigid position.

5. In a link, separate closed end link sections longitudinally alined with the closed inner ends abutting, opposite side plates bearing against the sides of said sections over the abutting ends thereof, the said plates formed with cooperating bars and blocks extending inwardly through and clamping the abutting ends of the sections rigidly together, and means for locking said side plates in position.

6. In a link, separate closed end link sections longitudinally alined with the closed inner ends abutting, opposite side plates locked in position clamping the link sections together, and alined block members extendings from the inner opposed faces of the plates through the link sections at opposite sides of the abutting ends thereof, said block members abutting and engaging the link sections to prevent movements thereof.

7. In a link, separate closed end link sections longitudinally alined with the closed inner ends abutting, a side plate having projecting bars extending through the link sections at opposite sides of and clamping the abutting closed ends of the sections, an opposite side plate fitting over the ends of said bars and against the link sections with the bars extended beyond the plate, transverse grooves in the extended ends of the bars, and a key plate for fitting over the ends of the bars and engaging the grooves thereof to lock said plates and link sections in link forming position.

8. In a link, separate link sections having their inner ends squared, said sections longitudinally alined with the inner squared ends abutting, and opposite side members interlocking and securing the abutting ends of the sections together in link forming position.

9. In a link, separate closed end link sections having squared inner ends, said sections longitudinally alined with the squared end abutting, opposite side plates over the abutting ends of the sections clamping the same in link forming position, and transverse bars extending between said plates through the link sections seated against the opposite sides of the abutting squared ends to secure the sections rigidly together against movement.

10. In a link, separable longitudinally alined link sections, and members engaging the longitudinal sides of and interlocking with said sections to clamp the same in link forming position.

11. In a link, separable and longitudinally alined link sections having their inner ends abutting, and means for securing said sections together in link forming position embodying members disposed at the outer sides of said link engaged with and maintaining said abutting section ends together.

12. In a link, separable longitudinally alined link sections having their inner ends abutting, removable means for securing said setcions together, including spaced members engaging and receiving the abutting section ends therebetween to maintain the sections in link forming position against relative movement, and means for locking said removable means in position on said sections.

Signed at Scranton, Lackawanna County, Pennsylvania, this 17th day of April, 1926.

JOHN L. EVANS.